United States Patent
Bailey et al.

(10) Patent No.: US 10,262,448 B2
(45) Date of Patent: Apr. 16, 2019

(54) REPURPOSING EXISTING ANIMATED CONTENT

(71) Applicant: DreamWorks Animation LLC, Glendale, CA (US)

(72) Inventors: Stephen Bailey, Glendale, CA (US); Martin Watt, Glendale, CA (US); Bo Morgan, Glendale, CA (US); James O'Brien, Glendale, CA (US)

(73) Assignee: DreamWorks Animation L.L.C., Universal City, CA (US)

( * ) Notice: Subject to any disclaimer, the term of this patent is extended or adjusted under 35 U.S.C. 154(b) by 0 days.

(21) Appl. No.: 15/409,479

(22) Filed: Jan. 18, 2017

(65) Prior Publication Data

US 2017/0206696 A1 Jul. 20, 2017

Related U.S. Application Data

(60) Provisional application No. 62/280,654, filed on Jan. 19, 2016.

(51) Int. Cl.
*G06T 13/40* (2011.01)
*G06T 13/20* (2011.01)
(Continued)

(52) U.S. Cl.
CPC ............... *G06T 13/40* (2013.01); *G06T 7/20* (2013.01); *G06T 13/20* (2013.01); *G06T 17/20* (2013.01); *G06T 2200/04* (2013.01)

(58) Field of Classification Search
None
See application file for complete search history.

(56) References Cited

U.S. PATENT DOCUMENTS

| 2004/0179037 A1* | 9/2004 | Blattner | G06T 13/40 715/751 |
| 2007/0174010 A1* | 7/2007 | Bhat | G06T 13/00 702/66 |

(Continued)

OTHER PUBLICATIONS

Quirion, Sébastien, et al. "Comparing gplvm approaches for dimensionality reduction in character animation." (2008). APA.*

(Continued)

*Primary Examiner* — Ryan McCulley
(74) *Attorney, Agent, or Firm* — Dentons US LLP

(57) ABSTRACT

Systems and methods for automatically animating a character based on an existing corpus of animation are described. The character may be from a previously produced feature animated film, and the data used for training may be the data used to animate the character in the film. A low-dimensional embedding for subsets of the existing animation corresponding to different semantic labels may be learned by mapping high-dimensional rig control parameters to a latent space. A particle model may be used to move within the latent space, thereby generating novel animations corresponding to the space's semantic label, such as a pose. Bridges may link a first pose of a first model within the latent space that is similar to a second pose of a second model of the space. Animations corresponding to transitions between semantic labels may be generated by creating animation paths that traverse a bridge from one model into another.

30 Claims, 8 Drawing Sheets

(6 of 8 Drawing Sheet(s) Filed in Color)

(51) Int. Cl.
G06T 7/20 (2017.01)
G06T 17/20 (2006.01)

(56) References Cited

U.S. PATENT DOCUMENTS

2011/0292055 A1    12/2011   Hodgins et al.
2013/0147788 A1*   6/2013    Weise .................... G06T 13/40
                                                            345/419

OTHER PUBLICATIONS

Egges, Arjan, Tom Molet, and Nadia Magnenat-Thalmann. "Personalised real-time idle motion synthesis." Computer Graphics and Applications, 2004. PG 2004. Proceedings. 12th Pacific Conference on. IEEE, 2004.*
Deena, Salil, and Aphrodite Galata. "Speech-driven facial animation using a shared Gaussian process latent variable model." International Symposium on Visual Computing. Springer, Berlin, Heidelberg, 2009.*
Rhodin, Helge, et al. "Interactive motion mapping for real-time character control." Computer Graphics Forum. vol. 33. No. 2. 2014.*
Bailey et al., "Repurposing Hand Animation for Interactive Applications", Eurographics/ ACM SIGGRAPH Symposium on Computer Animation, 2016, pp. 1-10.
Extended European Search Report (Includes Supplementary European Search Report and Search Opinion) received for European Patent Application No. 17152134.7, dated May 29, 2017, 15 pages.
Grochow et al., "Style-Based Inverse Kinematics", Journal, ACM Transactions on Graphics (TOG)—Proceedings of ACM SIGGRAPH, vol. 23, No. 3, 2004, pp. 522-531.
Levine et al., "Continuous Character Control with Low-Dimensional Embeddings", ACM Transactions on Graphics, vol. 31, No. 4, Jul. 2012, pp. 28:1-28:10.
Sih et al., "Interactive Modeling of 3D Facial Expressions with Hierarchical Gaussian Process Latent Variable Models", IEEE, 2009, pp. 2477-2480.
Ukita, Norimichi, "Simultaneous Particle Tracking in Multi-Action Motion Models with Synthesized Paths", Image and Vision Computing, vol. 31, 2013, pp. 448-459.
Ye et al., "Synthesis of Responsive Motion Using a Dynamic Model", Computer Graphics Forum, vol. 29. No. 2. 2010, 8 pages.
Andrews et al. "Goal Directed Multi-Finger Manipulation: Control Policies and Analysis", School of Computer Science and Centre for Intelligent Machines, McGill University, May 9, 2013, 11 pages.
Barr, Alan H., "Global and Local Deformations of Solid Primitives", Computer Graphics, vol. 18, No. 3, Jul. 1984, 10 pages.
Bouaziz et al., "Online Modeling for Real-time Facial Animation",ACM Transactions on Graphics, vol. 32, No. 4, Article 40, Jul. 2013,10 pages.
Brand et al., "Style Machines", In Proceedings of the 27th Annual Conference on Computer Graphics and Interactive Technique, SIGGRAPH, Apr. 2000,12 pages.
Buck et al. "Performance-Driven Hand-Drawn Animation", NPAR 2000: First International Symposium on Non Photorealistic Animation and Rendering, Jun. 2000, 8 pages.
Cao et al., "3D Shape Regression for Real-time Facial Animation", ACM Transactions on Graphics, vol. 32, No. 4, Article 41,Jul. 2013,10 pages.
Chai et al. "Vision-based Control of 3D Facial Animation", Euro graphics/SIGGRAPH Symposium on Computer Animation, 2003, 15 pages.

Coros et al., "Robust Task-based Control Policies for Physics-based Characters", ACM Trans. Graph, University of British Columbia, 2009, 9 pages.
Kovar et al., "Motion Graphs", To appear in Proceedings of SIGGRAPH '02,2002,10 pages.
Lau et al., "Modeling Spatial and Temporal Variation in Motion Data", ACM Trans. Graph. vol. 28,No. 5, 2009, 10 pages.
Lawrence et al., "Hierarchical Gaussian Process Latent Variable Models", In International Conference in Machine Learning, 2007, 8 pages.
Lawrence, N. D., "Large Scale Learning with the Gaussian Process Latent Variable Model", Technical Report No. CS-06-05, Feb. 5, 2006, 18 pages.
Lawrence et al., "Local Distance Preservation in the GP-LVM through Back Constraints", In Proceedings of the 23rd International Conference on Machine Learning, ACM, 2006, 8 pages.
Lee, et al., "Compact Character Controllers", ACM Trans. Graph, University of Washington, 2009, 8 pages.
Lee et al., "Interactive Control of Avatars Animated with Human Motion Data", In Proceedings of the 29th Annual Conference on Computer Graphics and Interactive Techniques, ACM, 2002,10 pages.
Levine et al., "Continuous Character Control With Low-dimensional Embeddings", ACM Transactions on Graphics 31, 4, 28. 2012, 10 pages.
Lewis, et al., "Pose Space Deformation: A Unified Approach to Shape Interpolation and Skeleton-Driven Deformation", In Proceedings of the 27th Annual Conference on Computer Graphics and Interactive Techniques, Centropolis, 2000, 8 pages.
Lo et al., "Real-Time Planning for Parameterized Human Motion", Euro graphics/ ACM SIGGRAPH Symposium on Computer Animation, 2008, 10 pages.
Muico et al., "Contact-aware Nonlinear Control of Dynamic Characters", Advanced Technology Labs, Adobe Systems Incorporated, University of Washington, 2009, 9 pages.
Mukai et al., "Geostatistical Motion Interpolation", In ACM SIGGRAPH 2005 Papers, ACM, 2005, 9 pages.
Sederberg et al., "Free-form deformation of solid geometric models", ACM SIGGRAPH Computer Graphics, vol. 20, No. 4,Aug. 1986,pp. 151-160.
Seol et al., "Artist Friendly Facial Animation Retargeting", ACM Transactions on Graphics, vol. 30, No. 6, Article 162, Dec. 2011, 10 pages.
Singh et al., "Wires: A Geometric Deformation Technique", Proceedings of 25th Annual Conference on Computer Graphics and Interactive techniques, 1998, 20 pages.
Tan et al., "Learning Bicycle Stunts", ACM Transactions on Graphics, vol. 33, No. 4, Article 50, Jul. 2014, 12 pages.
Thalmann et al., "Joint-Dependent Local Deformations for Hand Animation and Object Grasping", Proceedings of Graphics Interface '88, Université de Montréal, 1988, 12 pages.
Treuille et al., "Near-optimal Character Animation with Continuous Control", ACM Transactions on Graphics, vol. 26, No. 3, Article 7,Jul. 2007,8 pages.
Urtasun et al., "Priors for People Tracking from Small Training Sets??", In Proceedings of the Tenth IEEE international Conference on Computer Vision (ICCV'05) vol. 1, 2005, 8 pages.
Wang et al., "Gaussian Process Dynamical Models", In In NIPS, MIT Press, 2006, 8 pages.
Wang et al., "Gaussian Process Dynamical Models for Human Motion", IEEE Transactions on Pattern Analysis and Machine Intelligence, vol. 30, No. 2, Feb. 2008, pp. 283-298.
Ye et al., "Synthesis of Responsive Motion Using a Dynamic Model", Computer Graphics Forum 29, vol. 2, pp. 555-562. 2010. 8 pages.

* cited by examiner

REPURPOSING EXISTING ANIMATED CONTENT

CROSS-REFERENCE TO RELATED APPLICATIONS

This application claims priority under 35 U.S.C. § 119(e) to U.S. Provisional Patent Application Ser. No. 62/280,654, titled "Repurposing Hand Animation for Interactive Applications," filed Jan. 19, 2016, the contents of which are incorporated herein by reference in their entirety for all purposes.

BACKGROUND

1. Field

The present disclosure relates to computer-generated animation and, more specifically, to repurposing existing animated content of a character to synthesize new animated content of the character.

2. Related Art

A computer-generated feature animation is typically a labor- and time-intensive process that results in the creation of characters with compelling and unique personalities. However, because of the labor- and time-intensive nature of computer-generated feature animation, taking one of these characters and synthesizing new content consisting of compelling and expressive animation of the character presents a challenge.

Statistical methods have been used to analyze and synthesize new motion data (e.g., as described in Brand and Hertzmann 2000, Mukai and Kuriyama 2005, and Lau et al. 2009). In particular, the Gaussian Process Latent Variable Model (GPLVM) (e.g., as described in Lawrence 2006) has been used for a number of applications directed to animation, such as satisfying constraints, tracking human motion (e.g., as described in Grochow et al. 2004, Urtasun et al. 2005, and Wang et al. 2008), or providing interactive control (e.g., as described in Ye and Liu 2010 and Levine et al. 2012). The GPLVM is used to reduce the dimension of the motion data and to create a statistical model of the animation.

However, while GPLVM tends to keep far data separated in a reduced dimensional space, it makes no effort to keep similar data points close together. Thus, to address this shortcoming, modifications to the GPLVM have been proposed to make it better suited for modeling motion data by addressing this limitation of the model. For example, back constraints (e.g., as described in Lawrence and Quirionero Candela 2006) have been applied to the GPLVM to preserve local distances. For another example, dynamic models (e.g., as described in Wang et al. 2006 and Lawrence 2007) have been introduced to model the time dependencies in animation data. For another example, a connectivity prior (e.g., as described in Levine et al. 2012) has been proposed to ensure a high degree of connectivity among the animation data embedded in the low-dimensional latent space.

Another shortcoming of the GPLVM is that the prior methods that model animation data using a GPLVM have only been used for full-body motion capture data. Similar techniques have not been applied to manually created animation for a film-quality character. A key difference between motion capture data and manually created film-quality animation is that the manually created animation from a film-quality animation lies in a significantly higher dimensional space than the motion capture data.

Furthermore, data-driven approaches to character control and animation synthesis have focused only on full-body tasks, which are based on motion graphs (e.g., as described in Kovar et al. 2002, Lee et al. 2002, Treuille et al. 2007, Lo and Zwicker 2008, and Lee et al. 2009). These methods use a graph structure to describe how motion clips from a library can be connected and reordered to accomplish a task. However, while these approaches perform well with a large training set, smaller data sets are not well-suited for motion graphs because of a lack of variety and transitions in the motions.

Similarly, other existing methods for character control include data-driven and physics-based approaches (e.g., as described in Coros et al. 2009, Muico et al. 2009, Levine et al. 2012, and Tan et al. 2014) are applied to full-body human motion or hand motion (e.g., as described in Andrews and Kry 2013). Thus, the tasks that the controllers are trained for can be quantifiably measured, such as locomotion or reaching tasks. However, existing methods do not animate a non-human character's face because tasks for facial animation are difficult to quantify.

Facial animation of non-human characters can be controlled by re-targeting recorded expressions. A commonly used method is blendshape mapping (e.g., as described in Buck et al. 2000, Chai et al. 2003, Seol et al. 2011, Bouaziz et al. 2013, and Cao et al. 2013), which maps expressions from an input model onto corresponding expressions from the target character. Then, motion is generated by blending between the different facial shapes of the character. This approach uses an input model, such as a video recording of a human, to drive the animation of the character. Blendshape mapping approaches, however, control facial animation with recordings of a model. In addition, blendshape mapping approaches require that the character's face be animated with blendshapes.

Lastly, as is well-known in the field, animated characters are controlled through an underlying rig, which deforms a surface mesh that defines a character. A variety of methods exist to map a character's rig controls to deformations of the surface mesh (e.g., as described in Barr 1984, Sederberg and Parry 1986, Magnenat-Thalmann et al. 1988, Singh and Fiume 1998, and Lewis et al. 2000). However, a technique that does not make assumptions about rig controls, and thus does not depend on an implementation of a particular type of mapping method, is needed.

SUMMARY

In one exemplary embodiment, new animated content of a character is rendered based on existing animated content of the character. In particular, a first set of rig parameters corresponding to a first plurality of frames of the existing animated content of the character is received. A second set of rig parameters corresponding to a second plurality of frames of the existing animated content of the character is received. The first and second sets of rig parameters have a first dimension. A first set of model parameters is generated based on the first set of rig parameters. A second set of model parameters is generated based on the second set of rig parameters. The first and second sets of model parameters have a second dimension smaller than the first dimension. A latent space is generated that comprises a first semantic model, a second semantic model, and a bridge. The latent space has the second dimension. The first semantic model is generated based on the first set of model parameters. The second semantic model is generated based on the second set of model parameters. The bridge links the first semantic model and the second semantic model. The new animated content of the character is generated based on a location within the latent space.

BRIEF DESCRIPTION OF THE FIGURES

The patent or application file contains at least one drawing executed in color. Copies of this patent or patent application publication with color drawings will be provided by the Office upon request and payment of the necessary fee.

The present application can be best understood by reference to the following description taken in conjunction with the accompanying drawing figures, in which like parts may be referred to by like numerals.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown, but is to be accorded the scope consistent with the claims.

For descriptive purposes, throughout this disclosure, software, software modules, software objects, and the like may be described as performing various functions. One of ordinary skill in the art, however, will recognize that software may not actively perform any function and instead may include instructions that are executable on a computer processor. As such, although software may be described herein as performing a function, it should be appreciated that a computer processor or other computing device may typically perform those functions attributed herein to software modules or objects by executing computer instructions provided by the software modules or objects.

As noted above, creating characters with compelling and unique personalities for a computer-generated feature animation can be labor and time intensive. Thus, as described below, existing animated content of a character can be repurposed by mapping rig control parameters to a latent space in order to synthesize new animated content of the character.

Figure 1:
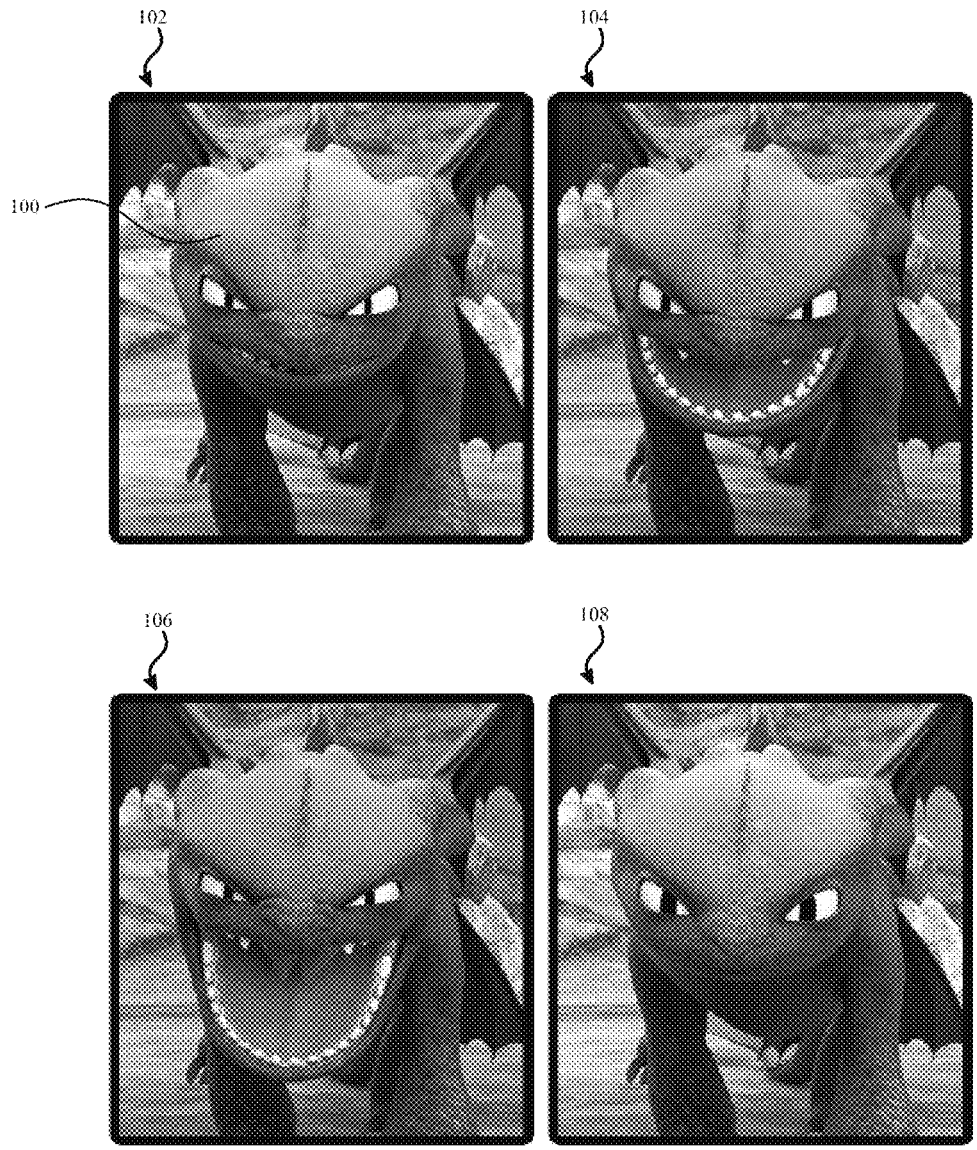
FIG. 1 illustrates exemplary existing animated content of a character.
Figure 2:
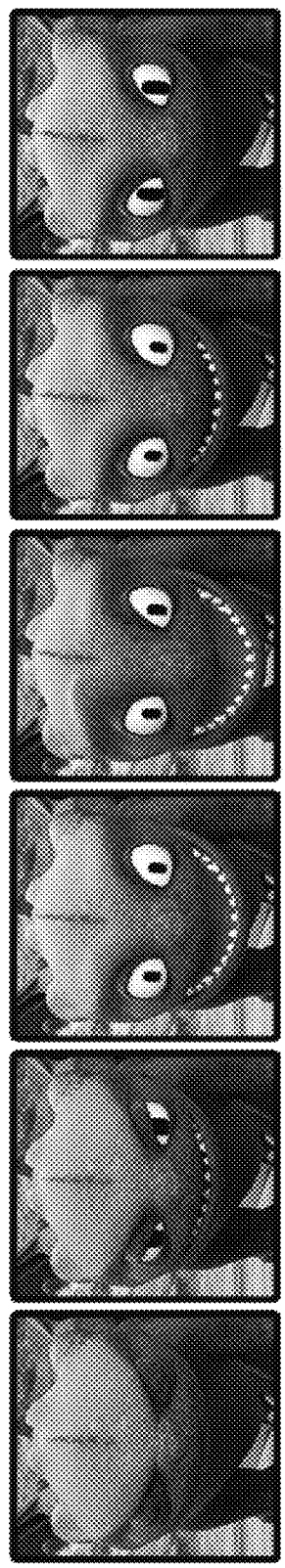
FIG. 2 illustrates exemplary new animated content of the character rendered based on the existing content.

For example, FIG. 1 depicts existing animated content 102-108 of Toothless from the feature animated film How to Train Your Dragon 2. FIG. 2 depicts newly synthesized animation of Toothless generated using exemplary process 300 described below and depicted in FIG. 3.

Figure 3:
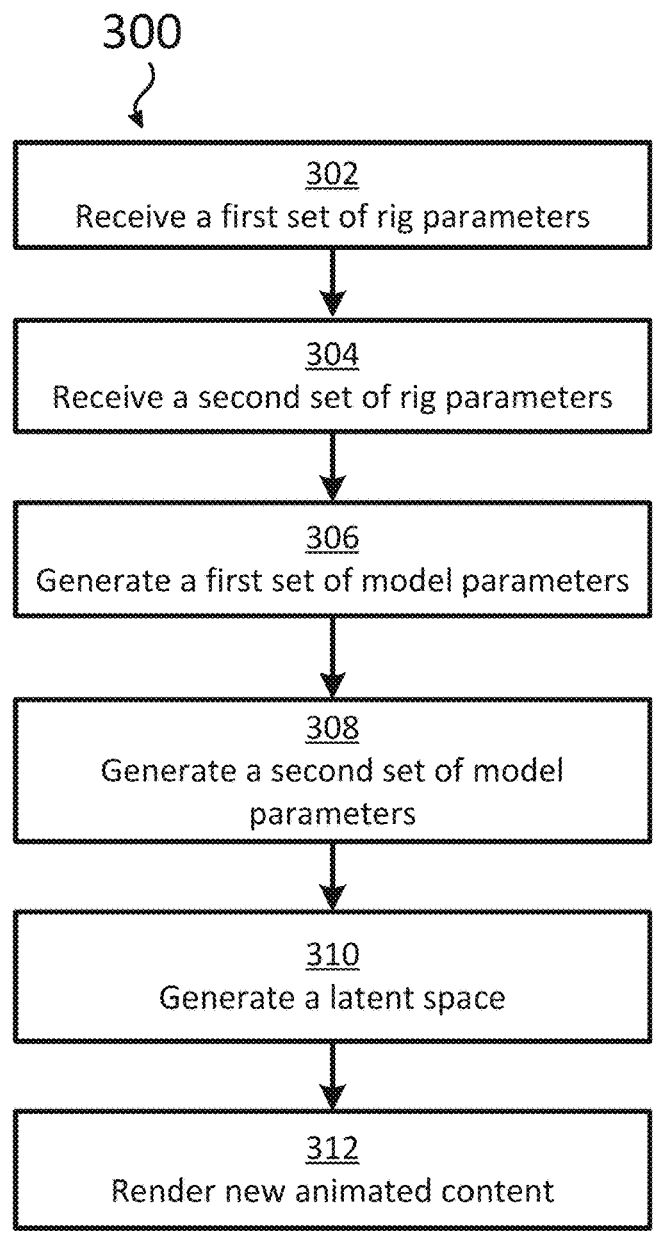
FIG. 3 illustrates an exemplary process of rendering new animated content from existing animated content.

In FIG. 3, at block 302, a first set of rig parameters corresponding to a first plurality of frames of the existing animated content of the character is received. At block 304, a second set of rig parameters corresponding to a second plurality of frames of the existing animated content of the character is received. The first and second sets of rig parameters have a first dimension.

In some embodiments, the first plurality of frames is associated with a first pose of the character and the second plurality of frames is associated with a second pose of the character. The second pose is different than the first pose. The first pose can comprise a particular facial expression of the character.

At block 306, a first set of model parameters is generated based on the first set of rig parameters. At block 308, a second set of model parameters is generated based on the second set of rig parameters. The first and second sets of model parameters have a second dimension that is smaller than the first dimension.

In some embodiments, a first set of intermediate space parameters and a second set of intermediate space parameters are generated from the first set of rig parameters and the second set of rig parameters, respectively. Then, the first set of model parameters and the second set of model parameters are generated based on the first set of rig parameters and the second set of rig parameters, respectively.

In some embodiments, a first set of scaled parameters and a second set of scaled parameters are generated from the first set of rig parameters and the second set of rig parameters, respectively. Then, the first set of intermediate space parameters and the second set of intermediate space parameters are generated based on the first set of scaled parameters and the second set of scaled parameters, respectively.

In some embodiments, generating a set of model parameters from a set of intermediate space parameters comprises applying a non-linear dimensionality reduction algorithm to the set of intermediate space parameters. In some embodiments, this non-linear dimensionality reduction algorithm is a Gaussian process latent variable model (GPLVM). In some embodiments, generating the set of intermediate space parameters from a set of scaled parameters comprises applying a linear dimensionality reduction algorithm to the set of scaled parameters. In some embodiments, this linear dimensionality reduction algorithm is principal component analysis.

At block 310, a latent space that comprises a first semantic model, a second semantic model, and a bridge is generated. The latent space has a dimension equal to the second dimension. The first semantic model is generated based on the first set of model parameters. The second semantic model is generated based on the second set of model parameters. The bridge links the first semantic model and the second semantic model.

In some embodiments, creating the bridge comprises identifying a first transition point within the first semantic model, identifying a second transition point within the second semantic model, and linking the first transition point with the second transition point. In some examples, the first transition point and the second transition point are identified based on similarities between a frame associated with the first transition point and a frame associated with the second transition point. In some embodiments, the first transition point and the second transition point are identified using a pose-matching optimization function.

At block 312, the new animated content of the character is rendered based on a location within the latent space. In some embodiments, rendering the new animated content of the character based on the location within the latent space comprises determining a model parameter that corresponds to the location within the latent space, determining a rig parameter that corresponds to the model parameter, and then rendering a frame of animation associated with the determined rig parameter. In some embodiments, rendering the new animated content of the character based on the location within the latent space comprises determining a model parameter that corresponds to the location within the latent space, determining an intermediate space parameter that corresponds to the model parameter, determining a scaled parameter that corresponds to the intermediate space parameter, determining a rig parameter that corresponds to the scaled parameter, and then rendering a frame of animation associated with the determined rig parameter.

In some embodiments, a particle model is used to move a particle within the latent space, and the rendered new animated content of the character corresponds to the particle's location (i.e., position) within the latent space as the particle is moved within the latent space. The particle is moved in accordance with an animation curve embedded within the latent space, and is moved between two or more different animation curves via one or more bridges between the animation curves.

In some embodiments, it is determined whether the particle is not moved for at least a predetermined amount of time. The character may be "idling" when the particle is not moved for at least the predetermined amount of time. In some examples, if it is determined that the particle is not moved for at least the predetermined amount of time, the particle is moved around a hover point within the latent space, and the particle is not moved beyond a predetermined distance from the hover point. A "hovering" particle adds variety to the idling pose of the character.

Some of the particulars of process 300, including the mathematics involved in process 300, are set forth in more detail below.

1.1 Scaling Rig Controls

In one exemplary embodiment, given a large set of training animation of the character, represented as a sequence of rig control parameters, a mapping is generated between a low dimensional latent space and the rig parameters. The sequence of rig control parameters correspond to a sequence of frames of the animated character. For example, FIG. 1 illustrates four frames 102-108 of a synthesized roar animation of the character Toothless the dragon 100 from the feature animated film How to Train Your Dragon 2. The facial expression of Toothless 100 differs in each frame, as each frame represents a specific stage of the roar. The specific pose (e.g., facial expression) of Toothless 100 shown in frames 102-108 can be represented by a corresponding sequence of rig control parameters.

The mapping between the low dimensional latent space and the rig parameters may be generated in three stages. First, each rig control parameter in the training data is scaled to proportionally weight the controls to changes in the final mesh. Second, the training animation data is reduced linearly. In some embodiments, the training animation data is reduced linearly using Principal Component Analysis (PCA). Third, the training data is non-linearly reduced and mapped to a lower dimensional latent space. In some embodiments, the Gaussian Process Latent Variable Model (GPLVM) is used to non-linearly reduce the training data to a three dimensional latent space. After an embedding of the training animation data in the latent space is found, any arbitrary point in the latent space may be mapped to values for the rig controls. This process of mapping from a set of rig control parameters to a low dimensional latent space is described in greater detail below.

In some embodiments, it is assumed that the rig control parameters p, when evaluated, produce a surface mesh. The $i^{th}$ vertex of this mesh is given by the function $e_i(p)$. In some embodiments, it is further assumed that the rig evaluation function $e(p)$ is continuous, but no other assumptions are made. Thus, the evaluation function will be highly nonlinear.

Depending on how the evaluation function $e(p)$ is defined, large changes in some rig control parameters can result in small changes in the output surface mesh while small changes in other parameters can result in large changes in the mesh. Specifically, for some setting of the rig control parameters p, the value $$\left\| \frac{\partial e(p)}{\partial p_i} \right\|$$

may be large for the $i^{th}$ rig control parameter, but the value $$\left\| \frac{\partial e(p)}{\partial p_j} \right\|$$

may be small for some other rig control parameter. Thus, there exists the possibility that some rig controls will have a very small effect on the surface mesh but have a large variance across the training animation data. If PCA is applied in this case, each component of the data will be scaled such that the principal axes of the transformation do not align with these controls with high variance but low influence on the mesh.

In some embodiments, to avoid the above-described situation, the rig control parameters are scaled about the sample average to obtain $z=W(p-\bar{p})+\bar{p}$, where W represents a diagonal matrix and $w_i$ represents the amount to scale the $i^{th}$ rig control parameter by. W is chosen such that a unit change in the scaled rig control parameter space approximately corresponds with a unit change in the surface mesh. Specifically, for the $i^{th}$ rig control parameter, $$\left\| \frac{\partial}{\partial z_i} e(W^{-1}(z-\bar{p}) + \bar{p}) \right\| = 1, \quad (1)$$

where z is any possible value of the scaled rig control parameters. Then, $p=W^{-1}z$ and the chain rule may be used to find that $$\left\| \frac{\partial e(p)}{\partial p_i} \frac{\partial}{\partial z_i} [w_i^{-1}(z_i - \bar{p}_i) + \bar{p}_i] \right\| = 1. \quad (2)$$

In some embodiments, Equation (2) is used to solve for the weights to find that $$w_i = \left\| \frac{\partial e(p)}{\partial p_i} \right\|.$$

Because e(p) is a generally nonlinear function, Equation (2) cannot be satisfied for all possible values of p for a fixed W. Instead, the norm of the partial derivative can be approximated by evaluating the rig at the sample mean $\bar{p}$ of the training data and at several points about the mean. For rig control parameter i, a least squares error problem can be constructed to approximate the norm of the partial derivative by $$\left\|\frac{\partial e(p)}{\partial p_i}\right\| \approx \operatorname*{argmin}_{w} \sum_{n=-2}^{2} (\|e(\bar{p}) - e(\bar{p} + n\sigma_i)\| - w\|n\sigma_i\|)^2 \quad (3)$$

where $\sigma_i$ is a vector with the sample standard deviation of the $i^{th}$ rig control parameter in the $i^{th}$ position and zeros elsewhere. For example, in Equation (3), the set of values $n \in \{-2, -1, 0, 1, 2\}$ was found to produce good results. This least squares problem is solved separately for each $w_i$.

1.2 Linear Dimensionality Reduction

Generally, a fully-rigged main character for a feature animation film can have on the order of thousands of rig controls. Depending on the amount and/or nature of the rig controls, some of these rig controls may not be used in the training data. For example, some rig controls may only have a small, almost imperceptible effect on the animation and, as such, may not be used in the training data. In some embodiments, to remove these minimally-impactful controls and simplify the data, the dimension of the training data is linearly reduced using Principal Component Analysis (PCA). Consequently, small variations in the training data are treated as noise and are removed. This initial linear reduction also helps to improve the results of a subsequent non-linear dimensionality reduction, for example a Gaussian Process Latent Variable Model (GPLVM) based reduction, that may be applied to the training data later on in the reduction process.

To demonstrate an exemplary use of PCA for linear dimensionality reduction, let z represent the scaled rig control parameters of a single frame of animation. There are $D_{rig}$ control parameters and N total number of frames of animation in the training set. The scaled animation data may be represented as $=[z_1, z_2, z_3, \ldots, z_N]$, where $z_i \in \mathbb{R}^{D_{rig}}$ is a column vector corresponding with the $i^{th}$ frame of animation. The sample mean of the data Z is denoted as $\bar{z}$. To compute the principal components of the training data, the mean is subtracted from each frame of animation. The singular value decomposition of the normalized data can then be computed using $$\bar{Z} = U\Sigma V^T, \quad (4)$$

where the matrix $\bar{Z}$ is the matrix Z with the sample mean subtracted from each column of the matrix.

The columns of the matrix U contain the principal components of the training data. The number of principal components $d_{pca}$ to use can be determined by considering the explained variance of the model. For example, the explained variance can be given by $$v(d) = \frac{\sum_{i=1}^{d} \sigma_i^2}{\sum_{i=1}^{k} \sigma_i^2}, \quad (5)$$

where $\sigma_i^2$ is the $i^{th}$ singular value of the normalized matrix $\bar{Z}$ and k is the rank of the matrix. In this example, the $d_{pca}$ is chosen such that $v(d_{pca}) \approx 0.85$. With the number of principal components chosen, the transformation matrix $T_{pca}$, which contains the first $d_{pca}$ columns of the matrix U, is defined. The training data may then be represented as a $d_{pca} \times n$ matrix Y given by $$Y = T_{pca}^T \bar{Z}. \quad (6)$$

The difference between running PCA on the original and scaled rig control parameters may be evaluated to determine the effect scaling the parameters have on the quality of the dimensionality reduction. If enough principal components are used to ensure that the explained variance is at or above 85%, there may be no discernible difference in quality of the animations between the scaled and original rig control parameters, but the GPLVMs described in the following section tend to perform better with the scaled rig control parameters. The difference between the original rig control parameters and the compressed data, measured as $\|z - T_{pca} T_{pca}^T z\|$, may be much larger when using the scaled rig control parameters compared to the unscaled parameters. When a small number of principal components are used, animations compressed with the scaled rig control parameters are visually better than the animations compressed with the unscaled data. Furthermore, the unscaled version often contains objectively undesirable meshes, such as the jaw of a character passing through the roof of its mouth. Therefore, quantitative comparisons in the rig control parameter space may not be sufficient to evaluate the effectiveness of the disclosed method.

1.3 Nonlinear Dimensionality Reduction

In some embodiments, having generated the linearly reduced data in the matrix Y, a low-dimensional embedding through the use of a Gaussian Process Latent Variable Model (GPLVM) is computed. The GPLVM is a generative, probabilistic model that is used to map nonlinearly the PCA transformed data Y to a set of points X in a latent space of dimension $d_{gplvm}$ where $d_{gplvm} < d_{pca}$. Dynamics in the latent space can be modeled by placing a Gaussian process prior on the points X. This dynamics prior keeps temporally close data points close together spatially. Because the models are trained using multiple segments of animation, the GPLVM with a dynamics prior tends to keep separate segments far apart in the latent space. This separation is caused by the GPLVM placing dissimilar frames of animation far apart without trying to place similar frames near each other. Therefore, a connectivity prior can be used to pull together similar frames of animation from separate segments.

The GPLVM models the training data Y as the output of a Gaussian process from the low dimensional embedding of the points X. It is assumed that each output of the Gaussian process is independent so that $$\log p(Y|X) = \sum_{i=1}^{d_{pca}} \log N(y_{i,:}|0, K_x), \quad (7)$$

which can be expressed as $$\log p(Y|X) = -\frac{d_{pca}}{2}|K_x| - \frac{1}{2}tr(K_x^{-1} YY^T) + const. \quad (8)$$

The $i^{th}$ row of Y is denoted as $y_{i,:}$. For the entries in the kernel matrix $K_x$, a radial basis function may be used. For example, the radial basis function is given by $$k_x(x_i, x_j) = \sigma_{rbf}^2 \exp\left(-\frac{1}{2l_x^2}\|x_i - x_j\|^2\right) + \delta_{ij}\sigma_{white}^2. \quad (9)$$

The kernel parameters $\sigma_{rbf}^2$, $\sigma_{white}^2$, and $\iota^2$ are optimized when the GPLVM is trained.

In some embodiments, the input data is composed of multiple segments of animation, and the dynamics of each segment are modeled. For example, a Gaussian process prior is placed on the latent points X. The input to the Gaussian process is time t and an indicator s where $s_i=j$ indicates that frame i is part of the $j^{th}$ animation segment. The indicator s is used in the kernel function to ensure that each segment is independent of all the others. Further, the dynamics prior is given by $$\psi_D(X,s,t) = \Sigma_{i=1}^{d_{gplvm}} \log N(X_{i,:}|0,K_{st}), \quad (10)$$

which can be expressed as $$\psi_D(X,s,t) = -\tfrac{1}{2}\Sigma_{i=1}^{d_{gplvm}} x_{i,:}^T K_{st}^{-1} x_{i,:} + \text{const}. \quad (11)$$

As such, the entries in the kernel matrix $K_{st}$ can be given by $$k_{st}(t_i, t_j, s_i, s_j) = 1[s_i = s_j]\left(\varsigma_{rbf}^2 \exp\left(-\frac{(t_i - t_j)^2}{2l_t^2}\right) + \varsigma_{white}^2 \delta_{ij}\right), \quad (12)$$

where $1[s_i=s_j]$ is the indicator function that returns 1 if $s_i$ and $s_j$ are equal and 0 otherwise.

In some embodiments, the connectivity prior allows for a modelling of the degree of connectivity amongst the latent points X by using graph diffusion kernels. For example, if G is a fully connected graph with a vertex for each training point in the latent space, then the edge weights of the graph can be defined as $$w(x_i,x_j) = \|x_i - x_j\|^{-p}. \quad (13)$$

The weights represent the probability of a transition from $x_i$ to $x_j$. The value of p determines the preference for transitions between closer points. The connectivity prior defines a random walk process on G and considers the latent points X to be well-connected if all points are likely to be reached from any other point through the random walk.

In some embodiments, the connectivity of the latent points is modeled as a diffusion kernel using, for example, the negative normalized graph Laplacian $H=T^{-1/2}T^{-1/2}$. The matrix T is diagonal with entries $T_{ii}=\Sigma_j w(x_i, x_j)$, and the matrix L is defined as $$L_{ij} \begin{cases} \Sigma_k w(x_i, x_k) & i = j \\ -w(x_i, x_j) & i \neq j \end{cases} \quad (14)$$

The graph diffusion kernel can be computed by applying the function $K^d=\exp \beta H$, where $\beta$ is a user-defined diffusion rate. Having computed the graph diffusion kernel, the connectivity prior can be calculated using the function:

$$\psi_C(x) = w_c \Sigma_i \Sigma_j K_{ij}^d, \quad (15)$$

where $w_c$ is a user-defined parameter specifying the weight of the connectivity prior.

Combining the dynamics and connectivity priors, the conditional probability of X may be expressed as $$p(X|t,s) \propto \exp \psi_D(X,s,t) \text{ext} \psi_C(X) \quad (16)$$

The latent points X and the hyper-parameters $\sigma_{rbf}$, $\sigma_{white}$, and $1_x$ can be estimated through maximum a posteriori (MAP) estimation. As such, the following can be maximized:

$$\log p(X,\sigma_{rbf},\sigma_{white},l_x|Y,s,t) = \log p(Y|K) + \psi_D(X,s,t) + \psi_C(X). \quad (17)$$

To maximize Equation (17), a scaled conjugate gradient can be used. The initial guess for the latent points is the first $d_{gplvm}$ rows of Y. The hyper-parameters for the dynamics prior are manually set and these values are not optimized.

Figure 4:
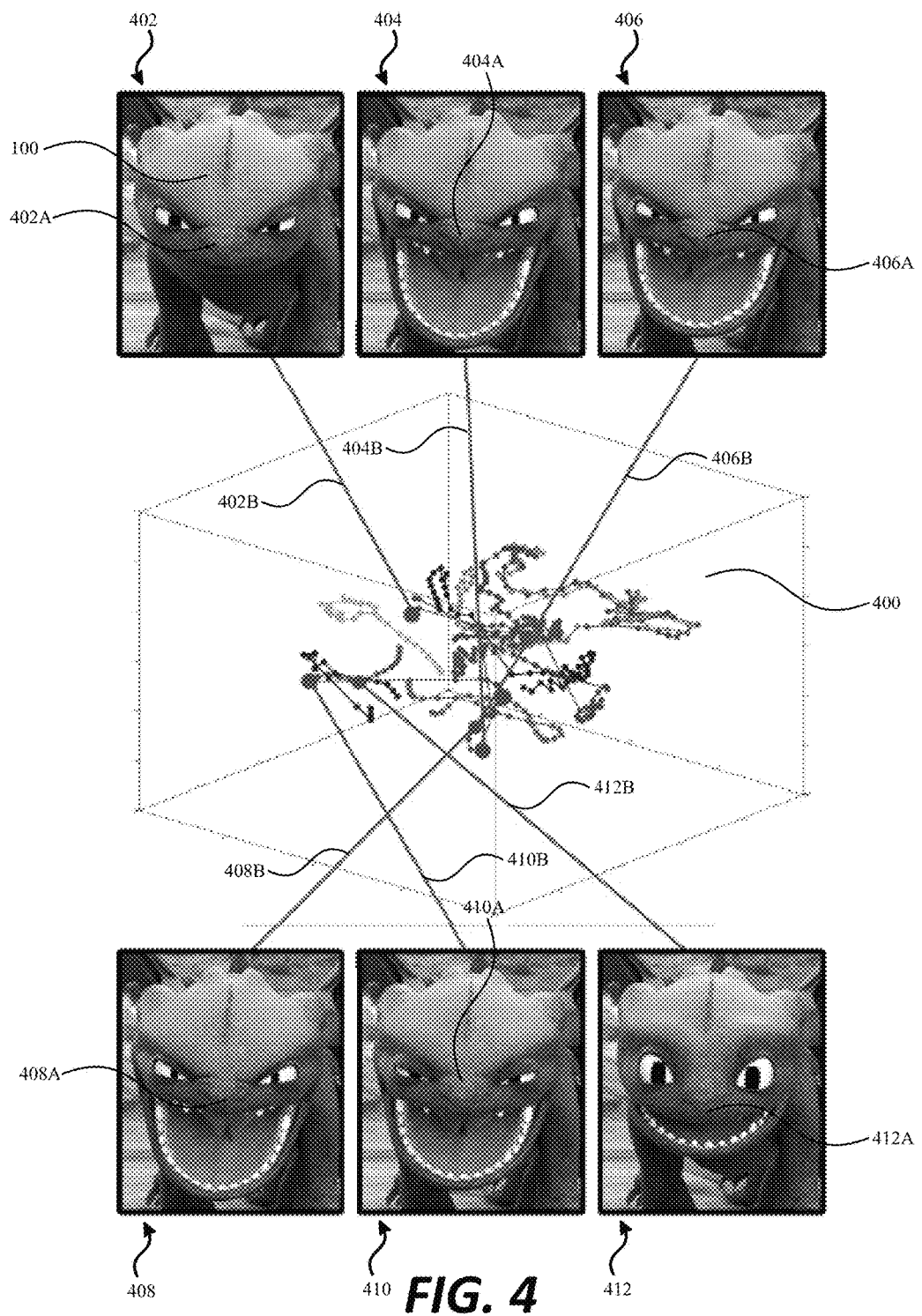
FIG. 4 illustrates an exemplary three-dimensional latent space learned from a training set of examples of a roar of the character.

FIG. 4 illustrates a plot of nine animation curves embedded in an exemplary three-dimensional latent space 400. The exemplary three-dimensional latent space 400 is learned for a training set of nine examples of a roar of Toothless 100 with a total of 393 frames. Representative images of six of the nine different roars of Toothless 100 that correspond to an animation curve embedded in the latent space 400 are shown. Roar 402A depicted in image 402 corresponds to animation curve 402B within the latent space 400. Roar 404A depicted in image 404 corresponds to animation curve 404B within the latent space 400. Roar 406A depicted in image 406 corresponds to animation curve 406B within the latent space 400. Roar 408A depicted in image 408 corresponds to animation curve 408B within the latent space 400. Roar 410A depicted in image 410 corresponds to animation curve 410B within the latent space 400. Roar 412A depicted in image 412 corresponds to animation curve 412B within the latent space 400.

1.4 Mapping to Rig Controls

Once a trained model is generated, rig control values can be reconstructed from a new point x' in the latent space. In some embodiments, the most likely point in the $d_{pca}$ dimensional space given the new point and the GPLVM model is first identified. Next, the matrix of principal components is multiplied to the identified point in the $d_{pca}$ dimensional space to obtain the scaled rig control parameters. Finally, the scaling factors are divided out and the mean is added to each parameter.

The distribution of a new point y given the corresponding latent point x and the GPLVM model M is a Gaussian distribution, where $$p(y|x,M) = N(y|YK_x^{-1}k_x(x), k_x(x,x) - k_x(x)^T K_x k_x(x)), \quad (18)$$

and where $k_x(x)$ is a column vector whose $i^{th}$ entry is given by $k_x x_i = k_x(x_i, x)$. Because the distribution is Gaussian, the most likely point in the $d_{pca}$ dimensional space can be given by the mean $YK_x^{-1}k_x(x)$. The product $YK_x^{-1}$ is precomputed, thus allowing this pose reconstruction problem to run linearly to the size of the training data for the model.

2. Animation Synthesis in Latent Space

In some embodiments, new animations are synthesized by generating a new path $P=[x_1, x_2, \ldots, x_t]$ through the latent space. The rig control parameters for each point in the path is computed by mapping the point from the latent space to the high dimensional rig control space. Because the latent space provides a continuous mapping, any smooth curve in this low-dimensional space results in smooth animation curves for each rig control parameter.

To synthesize a new path, a particle moving through the latent space can be simulated, and its position over time can be tracked. In some examples, the particle is controlled using a Lagrange multiplier method to enforce constraints on the system. In some examples, if a path that does not stray too far from a user-defined point is desired, a constraint is defined to enforce this behavior. In some examples, to add variations and noise to the path, a random force is applied. The particle simulation method works well for synthesizing facial animations.

In order to achieve real-time performance, it can be helpful if the number of training points in the GPLVM is small. Thus, in some embodiments, in order to condense the overall number of training points in the GPLVM, the training data is divided into sufficiently small subsets of training data, where each subset of data corresponds with a specific type of pose (e.g., a facial expression or action and/or a bodily expression or action), such as a roar. As such, a separate GPLVM is trained on each subset of training data that corresponds with a specific type of pose, with each subset of training data generating a model within the latent space that corresponds with the specific type of pose of its respective subset of training data. However, because these latent spaces are separate, points from one model (e.g., corresponding to a first pose of the character) to another model (e.g., corresponding to the second pose of the character) have to be mapped. The mapping allows a particle to transition between models, which in turn allows for the synthesis of poses across multiple subsets of the training data corresponding to different types of poses of the character.

2.1 Particle Simulation

In some embodiments, curves in the latent space are synthesized by tracking the position of a particle in the latent space over time. The input to a simulation is a path p(t) that the particle follows through time. In some examples, two constraints are applied to the system and a "random" force to add noise to the path. The first constraint ensures that the particle does not move too far from the path. The second constraint ensures that the particle remains in areas of high probability in the GPLVM. Because there may be instances where both constraints cannot be satisfied simultaneously, the path-following constraint is modeled as a hard constraint that must be satisfied, and the other constraint is modeled as a soft constraint that may be violated.

In some embodiments, given some path p(t) parametrized by time, it is required that the particle does not drift too far away from the curve. Thus, to enforce this requirement, the following inequality constraint is applied:

$$\|x-p(t)\|^2 - r^2 \geq 0. \quad (19)$$

This inequality constraint ensures that the particle at location x stays within a distance r from the point p(t) at time t. Forward simulation with this constraint can be computed using the Lagrange multiplier method.

Further, a force F acting on the particle at time t is defined. Subsequently, the Lagrange multiplier method is applied to compute an additional force $F_c$ that is applied to the particle to ensure that the constraint is satisfied. For example, the constraint force is given by $F_c = \lambda g$, where $g = x(t) - p(t)$, the multiplier $\lambda$ for a particle of unit mass is given by $$\lambda \frac{-g^T F + G}{g^T g}, \quad (20)$$

and the scalar G is given by $$G = (\dot{x}(t) - \dot{p}(t))^T (\dot{x}(t) - \dot{p}(t)) + 2\alpha g^T \dot{x}(t) - g^T \ddot{p}(t)) + \frac{1}{2} \beta^2 (g^T g - r^2). \quad (21)$$

The parameters $\alpha$ and $\beta$ are selected by the user to control how quickly a system violating the constraints returns to a state satisfying them. For example, a $\beta$ of $\beta = \alpha^2$ can be set.

In this case, the term $F_c$ described above will apply a force to satisfy the equality constraint $\|x(t) - p(t)\|^2 - r^2 = 0$. Further, to allow the particle to move freely within the radius around the target point, the term $F_c$ can be constrained to only point towards the target point p(t), which is accomplished by setting $\lambda = 0$ whenever $\lambda > 0$.

The second constraint pushes the particle towards high probability regions in the latent space. The GPLVM provides a probability distribution over the latent space $p(x(t) | M)$, and this distribution is used to push the particle towards "probable" regions, which may provide better reconstructed poses as compared to less probable regions of the latent space. However, models trained with facial animations are capable of synthesizing reasonable poses from less likely regions of the latent space. Generally, these lower probability poses do not contain visual defects such as an overly stretched face or interpenetrating meshes. Therefore, keeping the particle in a high probability region is not critical, and thus may be violated if necessary to satisfy the path constraint.

In some embodiments, the likelihood constraint is modeled as a force applied to the particle that points in the direction of the gradient of the PDF. The magnitude of the force can be determined by the value of the PDF evaluated at the particle's current location. For example, if the value is above some empirically chosen quantity v, the magnitude is small, and if the value is below v, the magnitude is large. These properties are modeled as a sigmoid function so that the force function is continuous for numerical integration. As such, the magnitude can be expressed as $$S(t) = a \frac{1}{1 + \exp\left(\frac{p(x(t) | M - v}{l}\right)}, \quad (22)$$

and the constraint force can be expressed as $$F_{GPLVM}(t) = S(t) \frac{\partial p(x(t) | M}{\partial x} \Big/ \left\| \frac{\partial p(x(t) | M}{\partial x} \right\|. \quad (23)$$

The parameters a and l are defined by the user. The user can also control the magnitude of the force when the constraint is not satisfied and how quickly the magnitude approaches a. Computing the partial derivatives of the Gaussian process takes time quadratic to the size of the training data. However, if the size of the training set is small, the computations can be done in real-time.

In some embodiments, in addition to these constraint forces, a random force $F_{rand}(t)$ is applied to add variation to the particle's path. This force is modeled as a randomly drawn, zero-mean Gaussian process $$F_{rand}(t) \sim \mathcal{GP}_{P(0, k(t, t'))}. \quad (24)$$

Each component of $F_{rand}(t)$ is independent of all others. The co-variance function is given by $$k(t, t') = \alpha \exp\left(-\frac{1}{2\gamma}(t - t')^2\right), \quad (25)$$

where $\alpha$ and $\gamma$ are user-defined parameters that control the magnitude and smoothness of the random force. This random force adds noise and variations to the particle's movement through the latent space. As such, there can be at least small variations in each repetition that a particle follows a particular path. This allows for the synthesis of unique animations with small but noticeable differences even along the same path.

Further, the particle can be simulated forward in time using, for example, a fourth-order Runge-Kutta integration method. A piecewise linear function is used for the path p(t), which is defined by a set of points $[p_1, p_2, \ldots, p_n]$ such that $p(t_i)=p_i$ and $t_i$ is the time of the $i^{th}$ frame of animation. Integration across multiple frames of animation is avoided to prevent integration over discontinuities in the piecewise path function p(t). Section 4.3, below, describes an exemplary process for defining p(t).

2.2 Mapping Between Models

In general, a large set of heterogeneous motions cannot be accurately embedded in a low dimensional (e.g., d≤5) latent space. Therefore, in some embodiments, the training data is divided into small subsets of similar poses (e.g., similar facial expressions), and the embedding in the latent space is computed for each subset separately. However, a drawback of training separate models is that synthesizing animations transitioning amongst multiple models cannot be synthesized using a particle simulation method without a continuous path between the models. That is, an animation that smoothly transitions from one pose to another pose cannot be synthesized under the particle simulation method without a continuous path for the particle to follow between the different models.

As such, in some embodiments, a path is created between two models $M_1$ and $M_2$ by first computing a set S of corresponding points in both models within the latent space. For example, a pair of matching points $(x_1, x_2)$, where $x_1 \in M_1$ and $x_2 \in M_2$, is included in S if $\|g(x_1; M_1)-g(x_2; M_2)\|^2 < \in$, where g(x; M) is the function that maps x to the rig control parameter space. This enables the identification of points within the models $M_1$ and $M_2$ whose reconstructed poses are similar. The set of matching points identifies points in the two models, which are connected to form bridges between the two models. For example, to create a curve that moves between model $M_1$ to model $M_2$, a path in $M_1$ that ends at a matching point in S and a path that starts at the matching point in $M_2$ is created to form a bridge.

In some embodiments, to identify a pair of matching points for models $M_1$ and $M_2$, a point $x_1 \in M_1$ is used as a basis for computing the reconstructed rig control parameters $z_1 = g(x_1; M_1)$. Then, the point $z_1$ is transformed by the linear dimensionality reduction specified by model $M_2$ $$\hat{y}_1 = T_2^T[W_2(z_1-m_2)], \quad (26)$$

where $T_2$ represents the first d principal components of the PCA transformation given in model $M_2$, $W_2$ represents the diagonal matrix of scale values for each component, and $m_2$ represents the mean of training data used in model $M_2$.

Next, the point $x_2$ in the latent space of model $M_2$ is found, where $$x_2 = \underset{x}{\operatorname{argmin}}\left\|\hat{y}_1 - \underset{y}{\operatorname{argmax}}\log p(y \mid x, M_2)\right\|^2 \quad (27)$$

Because $y_i = f(x) + \in$, where $\in$ is additive Gaussian white noise, the maximum of p(y|x, $M_2$) occurs when y=f* where f*=K*[$K_x$]$^{-1}Y_2$ is the noise-free output for the test point x. Therefore, Equation (27) can be re-written as $$x_2 = \underset{x}{\operatorname{argmin}}\|\hat{y}_1 - K_*[K_x]^{-1}Y_2\|^2. \quad (28)$$

Figure 5:
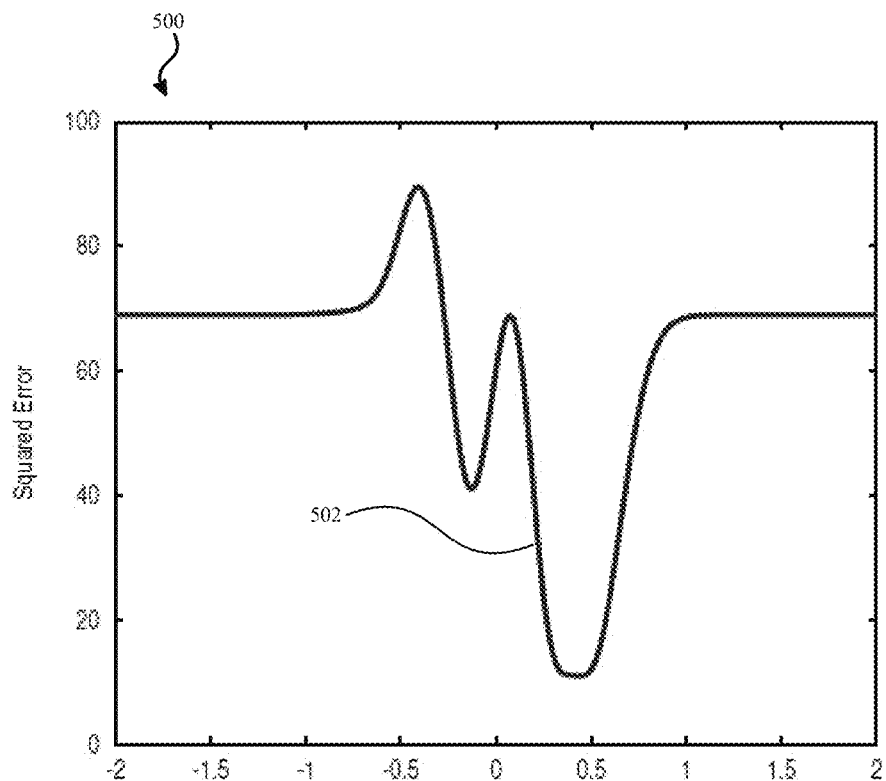
FIG. 5 illustrates an exemplary cross-section plot of a pose matching optimization function.

As such, the problem of finding the best matching $x_2 \in M_2$ given the point $x_1 \in M_1$ can now be formulated as a nonlinear optimization problem, which can be solved using the scaled conjugate gradient algorithm. However, because the function is multi-modal, the optimization algorithm is evaluated multiple times with randomly selected initial values to attempt to find the global minimizer. Further, large steps are not taken during the optimization routine because the gradient of the objective function quickly goes to zero as $x_2$ moves away from the training points in the model as illustrated, for example, in the cross section plot 500 of the objective function 502 depicted in FIG. 5. The pose matching optimization function 502 shows the nonlinear behavior of the function and the flat regions as the function extends to the left and the right.

In some embodiments, in order to create an animation that transitions between two or more models, a first curve can be generated in the first model that ends at one of the precomputed transition points, and a second curve can be generated in the second model that starts at the corresponding transition point from the first model. Then, the animation may be synthesized by reconstructing the poses along the two curves and rendering the animation from the second model right after the animation from the first model.

Figure 6:
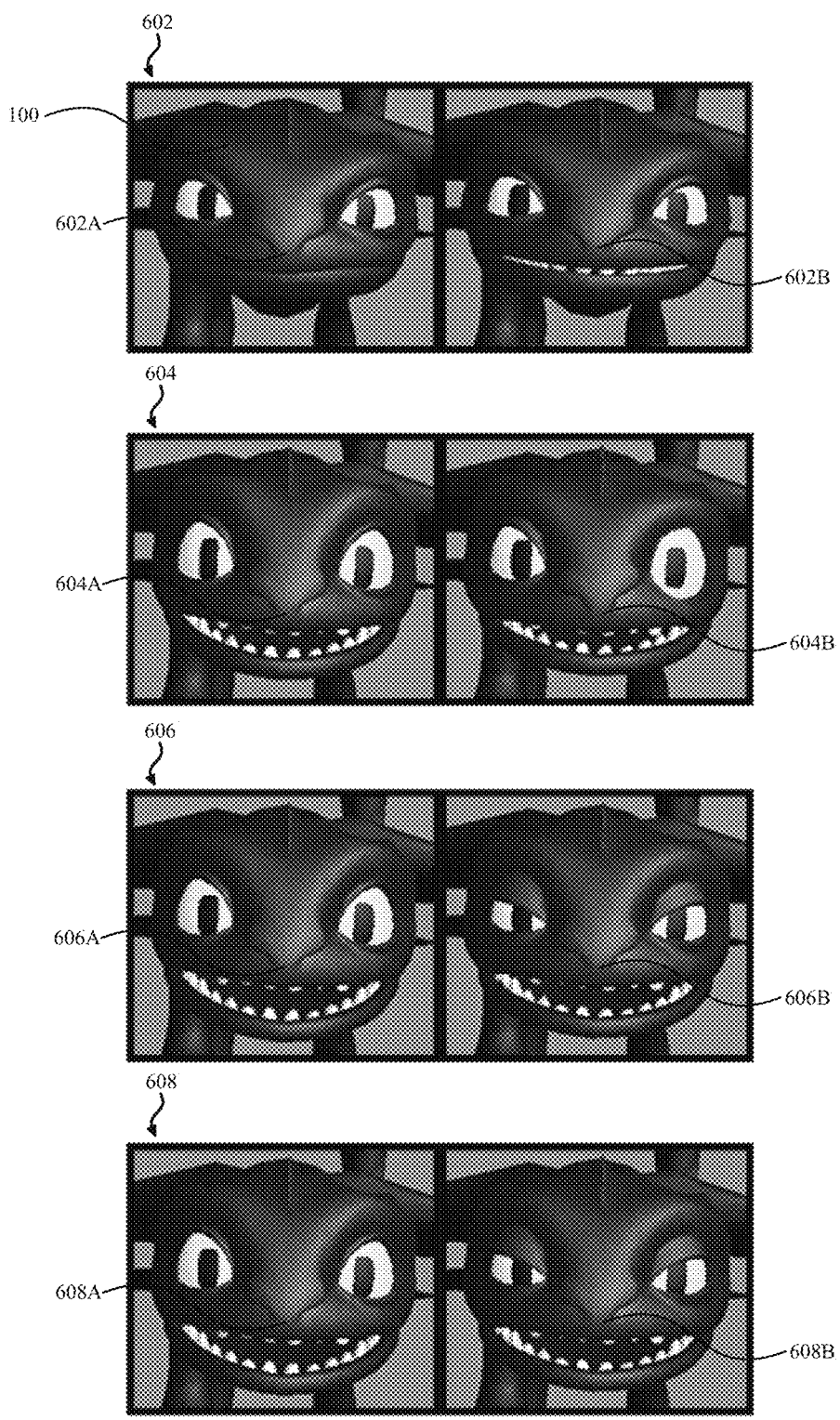
FIG. 6 illustrates four examples of best-matching poses identified between two different models within the latent space.

FIG. 6 illustrates four sample pairs 602, 604, 606, and 608 of the best-matching poses of Toothless 100 found between two different models. In each pair, the pose on the left is generated from a model trained on animations with grumpy-looking animations, and the pose on the right is generated from happy-looking animations. That is, in pair 602, pose 602A is a grumpy-looking Toothless 100, and pose 602B is a happy-looking Toothless 100 that is a best-matching happy pose to grumpy pose 602A. In pair 604, pose 604A is a grumpy-looking Toothless 100, and pose 604B is a happy-looking Toothless 100 that is a best-matching happy pose to grumpy pose 604A. In pair 606, pose 606A is a grumpy-looking Toothless 100, and pose 606B is a happy-looking Toothless 100 that is a best-matching happy pose to grumpy pose 606A. In pair 608, pose 608A is a grumpy-looking Toothless 100, and pose 608B is a happy-looking Toothless 100 that is a best-matching happy pose to grumpy pose 608A.

However, as shown in FIG. 6, the poses reconstructed from matching latent points in two different models may not necessarily be identical. As a result, there can be a discontinuity in the animation at the transition between the two models. In some embodiments, to overcome this problem, a short blend is performed between the two poses in the rig control parameter space at the transition point.

2.3 Synthesis Control

In some embodiments, an interactive application with a set of commands provides intuitive control of the character's poses (e.g., facial expressions). These commands provide control over the particular pose the character is expressing at a specific time during the synthesized animation. With these poses, the synthesis algorithm can generate transitions between the poses and models specified in the commands. Four example commands, a MOVE command, an IDLE command, a TRANSITION command, and a PLAY SEGMENT command, are described in greater detail below.

Figure 7:
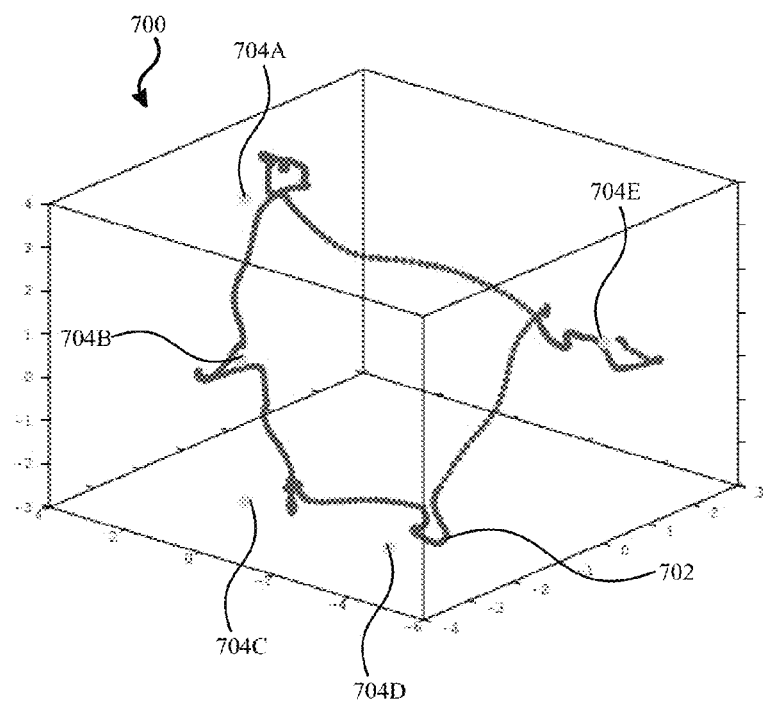
FIG. 7 illustrates exemplary particle trajectories through the latent space.
Figure 7:
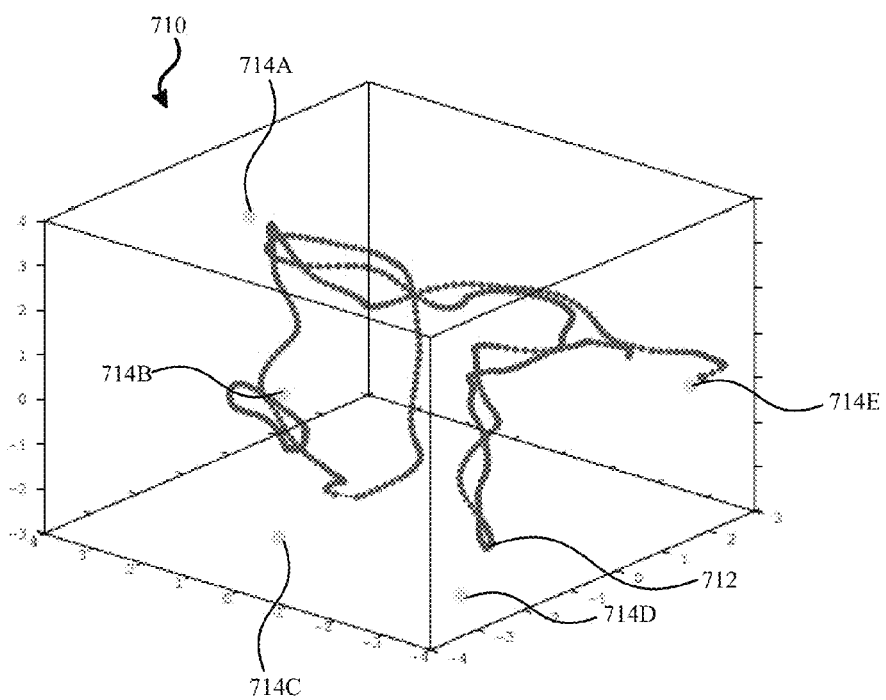

First, an exemplary MOVE command is described. The MOVE command takes a target point t in the latent space as input. The synthesized animation is controlled by moving the particle from its current position in the latent space to the target point. This is accomplished by setting the particle's path function p(t). Different processes may be used to generate the path. In some examples, a straight line is created from the current point to the target. In other examples, the shortest path is used in a weighted graph G of the training data, where the weights are computed by Equation (13) in the same way that they are used for the connectivity prior. FIG. 7 illustrates a side-by-side comparison of the particle trajectories through the latent space these two example processes. Plot 700 shows function 702 that is defined as a series of straight lines between points 704A-704E. By contrast, plot 710 shows corresponding points 714A-714E, but function 712 is instead defined as the shortest path through the weighted graph. In some examples, the start and end points may also be added as vertices in the graph. Further, in some examples, resulting path may be re-sampled so that $$\left\| \frac{\partial p(t)}{\partial t} \right\|$$

is constant for all t. This ensures that the particle follows the path at a consistent speed. Both of the described path-generating processes create compelling animation. A difference between the two processes is that the straight line path is shorter, and thus a particle following this path will reach the target in less time.

Second, an exemplary IDLE command is described. A character is said to be "idling" if the character is not performing a particular action and is instead in a non-active (e.g., "neutral") state. In such situations, it may be beneficial for the character to demonstrate an "idling" animation, where the pose (e.g., expression) of the character is controlled as it idles. As discussed, each set of training data consists of animations having similar poses (e.g., expressions). For example, one set may include only animation poses corresponding to a happy facial expression. Thus, each model corresponds with a single expression, and the type of expression of the character's face can be controlled by using the appropriate model. As such, idling animations can be synthesized by selecting a point p in the latent space and letting the particle "hover" around that point. Further, a radius r may be defined that can be adjusted to control how far the particle is allowed to stray away from point p. In some examples, this is accomplished by setting the path function that the particle follows to p(t)=p for a range of time t∈T in which the particle is to hover around the point. In some examples, to add variety to the animation, multiple latent points may be used. With multiple points, the synthesis is controlled by first picking a point from the set to move to. Next, the particle hovers about that point for a fixed or predetermined amount of time. When a new point is selected, the simulation repeats by moving to the new point and hovering around the new point.

Third, an exemplary TRANSITION command is described. The TRANSITION command is used to generate a continuous animation when moving between two models. In some embodiments, the TRANSITION command uses, in combination, the previously described MOVE and IDLE commands. Thus, to transition from model $M_1$ to model $M_2$, the particle is moved from its current position in model $M_1$ to the nearest precomputed matching point in the latent space. When the particle is close to the matching point, it "idles" about that point and the particle in $M_2$ also begins to "idle" about the corresponding matching point. The transition is completed by performing a blend between the high-dimensional rig control parameters from the two models while the particles are idling.

Fourth, an exemplary PLAY SEGMENT command is described. In some situations, playing a portion of (e.g., a segment of) an unmodified animation directly from the training data may be desirable. In some embodiments, the unmodified animation is played by using the embedding of the sequence in the latent space. The MOVE command can then be used to position the particle near the starting pose of the animation. When the particle is close enough to the starting pose of the animation, the simulation is stopped, and the particle is moved along the path of the embedded animation. When moving the particle to the start, the radius r is adjusted to ensure that it has moved close to the start to avoid discontinuities when the animation segment is played.

4. Animation System

Figure 8:
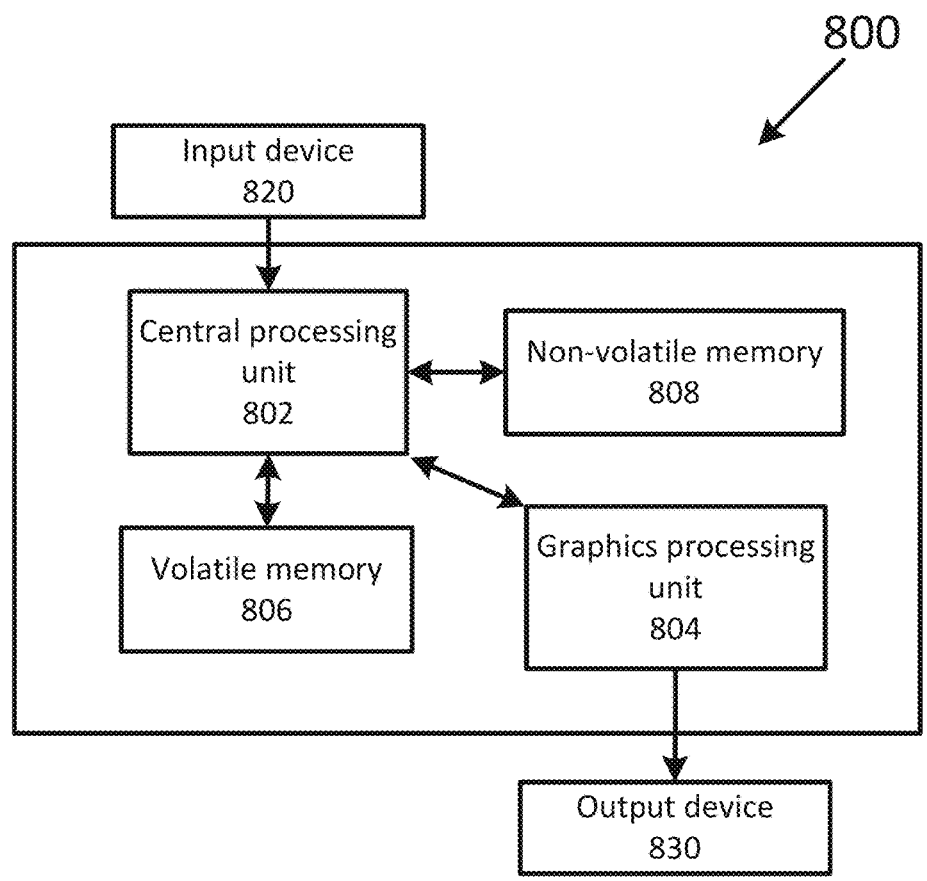
FIG. 8 illustrates an exemplary computing system.

FIG. 8 illustrates an exemplary animation system 800 that can be used to implement the animation synthesis process discussed above. The animation synthesis process can be implemented, for example, in either hardware or in software stored on a non-transitory computer-readable storage medium. The system can be configured to generate, modify, and evaluate the animation synthesis process for repurposing existing animated content of a character, as well as external processes used to render a computer-generated image of the character. The system can be further configured to receive input from a user and to display graphics, an image, or scene of an animation based on the animation synthesis process.

The animation system 800 can be configured to receive user input from an input device 820. The input device 820 can be any device that receives input from the user and transmits it to the animation system 800. For example, the input device 820 can be a keyboard, a mouse, a tablet, a stylus, or the like. Those skilled in the art will recognize that other types of input devices can also be used.

The animation system 800 can be configured to output graphics, images, or animation to an output device 830. The output device 830 can include any device that receives data from the animation system and presents the data to the user. For example, the output device 830 may include a liquid crystal display, a set of light-emitting diodes, a projector, or the like. Those skilled in the art will recognize that other types of output devices can also be used.

The animation system 800 may further include a central processing unit 802. The central processing unit may include one or more processing cores. The central processing unit 802 may be coupled to and able to communicate with the input device 820. Although the animation system 800 is illustrated with one central processing unit 802, the animation system 800 may include multiple processing units. The animation system 800 may also include a graphics processing unit 804. The graphics processing unit 804 may be dedicated to processing graphics-related data. The graphics processing unit 804 may include a single processing core or multiple processing cores. Although the animation system 800 is illustrated with one graphics processing unit 804, the animation system 800 may include a plurality of graphics processing units. The central processing unit 802 and/or the graphics processing unit 804 may be coupled to and be able to communicate data to the output device 830.

In one example, the animation system 800 may include one or more processors and instructions stored in a non-transitory computer-readable storage medium, such as a memory or storage device, that, when executed by the one or more processors, perform animation rendering using an animation synthesis process, as described above. In the context of the embodiments described herein, a "non-transitory computer-readable storage medium" can be any medium that can contain or store the program for use by or in connection with the instruction execution system, apparatus, or device. The non-transitory computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The animation system 800 may include volatile memory 806, which is a non-transitory computer-readable storage medium, in communication with the central processing unit 802. The volatile memory 806 may include, for example, random access memory, such as dynamic random access memory or static random access memory, or any other type of volatile memory. The volatile memory 806 may be used to store data or instructions during the operation of the animation system 800. Those skilled in the art will recognize that other types of volatile memory can also be used.

The animation system 800 may also include non-volatile memory 808, which is a non-transitory computer-readable storage medium, in communication with the central processing unit 802. The non-volatile memory 808 may include flash memory, hard disks, magnetic storage devices, read-only memory, or the like. The non-volatile memory 808 may be used to store animation data, synthesis algorithm data, computer instructions, or any other information. Those skilled in the art will recognize that other types of non-volatile memory can also be used.

The animation system 800 is not limited to the devices, configurations, and functionalities described above. For example, although a single volatile memory 806, non-volatile memory 808, central processing unit 802, graphics processing unit 804, input device 820, and output device 830 are illustrated, a plurality of any of these devices can be implemented internal or external to the animation system 800. In addition, the animation system 800 may include a network access device for accessing information on a network, such as an internal network or the Internet. Those skilled in the art will recognize that other configurations of the animation system 800 can be used.

Various exemplary embodiments are described herein. Reference is made to these examples in a non-limiting sense. They are provided to more broadly illustrate applicable aspects of the disclosed technology. Various changes may be made and equivalents may be substituted without departing from the true spirit and scope of the various embodiments. In addition, many modifications may be made to adapt a particular situation, material, composition of matter, process, process act(s), or step(s) to the objective(s), spirit, or scope of the various embodiments. Further, as will be appreciated by those with skill in the art, each of the individual variations described and illustrated herein has discrete components and features that may be readily separated from or combined with the features of any of the other several embodiments without departing from the scope or spirit of the various embodiments.

The invention claimed is:

1. A computer-implemented method for rendering new animated content of a character based on existing animated content of the character, the method comprising:
   receiving a first set of rig parameters corresponding to a first plurality of frames of the existing animated content of the character;
   receiving a second set of rig parameters corresponding to a second plurality of frames of the existing animated content of the character, the first and second sets of rig parameters having a first dimension;
   generating a first set of model parameters based on the first set of rig parameters;
   generating a second set of model parameters based on the second set of rig parameters, the first and second sets of model parameters having a second dimension smaller than the first dimension;
   generating a latent space that comprises a first semantic model, a second semantic model, and a bridge, wherein:
      the latent space has the second dimension,
      the first semantic model is generated based on the first set of model parameters,
      the second semantic model is generated based on the second set of model parameters, and
      the bridge links the first semantic model and the second semantic model;
   rendering the new animated content of the character based on a location within the latent space;
   moving a particle within the latent space using a particle model;
   determining that the particle is not moved for a predetermined amount of time; and
   in response to determining that the particle is not moved for the predetermined amount of time, moving the particle around a hover point within the latent space, wherein the particle does not move beyond a second predetermined distance from the hover point.

2. The computer-implemented method according to claim 1, wherein the first plurality of frames is associated with a first pose of the character, wherein the second plurality of frames is associated with a second pose of the character, and wherein the second pose is different than the first pose.

3. The computer-implemented method according to claim 2, wherein the first pose comprises a facial expression of the character.

4. The computer-implemented method according to claim 1, further comprising:
   identifying a first transition point within the first semantic model;
   identifying a second transition point within the second semantic model; and
   wherein the bridge links the first transition point with the second transition point.

5. The computer-implemented method according to claim 4, wherein the first transition point and the second transition point are identified based on similarities between a first frame associated with the first transition point and a second frame associated with the second transition point.

6. The computer-implemented method according to claim 4, wherein the first transition point and the second transition point are identified using a pose-matching optimization function.

7. The computer-implemented method according to claim 1, further comprising:
   generating a first set of intermediate space parameters from the first set of rig parameters;

generating a second set of intermediate space parameters from the second set of rig parameters;
generating the first set of model parameters from the first set of intermediate space parameters; and
generating the second set of model parameters from the second set of intermediate space parameters.

8. The computer-implemented method according to claim 7, wherein generating a set of model parameters from a set of intermediate space parameters comprises:
applying a non-linear dimensionality reduction algorithm to the set of intermediate space parameters.

9. The computer-implemented method according to claim 8, wherein the non-linear dimensionality reduction algorithm is a Gaussian process latent variable model.

10. The computer-implemented method according to claim 1, wherein rendering the new animated content of the character based on the location within the latent space comprises:
determining a new model parameter that corresponds to the location within the latent space;
determining a new rig parameter that corresponds to the new model parameter; and
rendering a new frame of animation associated with the determined new rig parameter.

11. The computer-implemented method according to claim 1, wherein rendering the new animated content of the character based on the location within the latent space further comprises:
determining a new intermediate space parameter that corresponds to the new model parameter;
determining a new scaled parameter that corresponds to the new intermediate space parameter;
determining a new rig parameter that corresponds to the new scaled parameter; and
rendering a new frame of animation associated with the determined new rig parameter.

12. The computer-implemented method according to claim 1, wherein the rendered new animated content of the character corresponds to the particle's location within the latent space as the particle is moved within the latent space.

13. The computer-implemented method according to claim 1, further comprising:
applying a constraint to the particle, wherein the constraint limits the movement of the particle within the latent space.

14. The computer-implemented method according to claim 13, wherein the constraint constrains the particle to be within a predetermined distance from a path within the latent space.

15. The computer-implemented method according claim 1, further comprising:
applying a random force to the particle.

16. The computer-implemented method according to claim 1, further comprising:
generating a first set of scaled parameters from the first set of rig parameters;
generating a second set of scaled parameters from the second set of rig parameters;
generating a first set of intermediate space parameters from the first set of scaled parameters;
generating a second set of intermediate space parameters from the second set of scaled parameters;
generating the first set of model parameters from the first set of intermediate space parameters; and
generating the second set of model parameters from the second set of intermediate space parameters.

17. The computer-implemented method according to claim 16, wherein generating the set of intermediate space parameters from a set of scaled parameters comprises applying a linear dimensionality reduction algorithm to the first and second sets of scaled parameters.

18. The computer-implemented method according to claim 17, wherein the linear dimensionality reduction algorithm is principal component analysis.

19. A non-transitory computer-readable storage medium comprising computer-executable instructions for rendering new animated content of a character based on existing animated content of the character, the computer-executable instructions comprising instructions for:
receiving a first set of rig parameters corresponding to a first plurality of frames of the existing animated content of the character;
receiving a second set of rig parameters corresponding to a second plurality of frames of the existing animated content of the character, the first and second sets of rig parameters having a first dimension;
generating a first set of model parameters based on the first set of rig parameters;
generating a second set of model parameters based on the second set of rig parameters, the first and second sets of model parameters having a second dimension smaller than the first dimension;
generating a latent space that comprises a first semantic model, a second semantic model, and a bridge, wherein:
the latent space has the second dimension,
the first semantic model is generated based on the first set of model parameters,
the second semantic model is generated based on the second set of model parameters, and
the bridge links the first semantic model and the second semantic model;
rendering the new animated content of the character based on a location within the latent space;
moving a particle within the latent space using a particle model;
determining that the particle is not moved for a predetermined amount of time; and
in response to determining that the particle is not moved for the predetermined amount of time, moving the particle around a hover point within the latent space, wherein the particle does not move beyond a second predetermined distance from the hover point.

20. The non-transitory computer-readable storage medium according to claim 19, wherein the first plurality of frames is associated with a first pose of the character, wherein the second plurality of frames is associated with a second pose of the character, and wherein the second pose is different than the first pose.

21. The non-transitory computer-readable storage medium according to claim 19, further comprising:
identifying a first transition point within the first semantic model;
identifying a second transition point within the second semantic model; and
wherein the bridge links the first transition point with the second transition point.

22. The non-transitory computer-readable storage medium according to claim 19, further comprising:
generating a first set of intermediate space parameters from the first set of rig parameters;
generating a second set of intermediate space parameters from the second set of rig parameters;

generating the first set of model parameters from the first set of intermediate space parameters; and generating the second set of model parameters from the second set of intermediate space parameters.

23. The non-transitory computer-readable storage medium according to claim 19, wherein rendering the new animated content of the character based on the location within the latent space comprises:

determining a new model parameter that corresponds to the location within the latent space;

determining a new rig parameter that corresponds to the new model parameter; and rendering a new frame of animation associated with the determined new rig parameter.

24. The non-transitory computer-readable storage medium according to claim 19, wherein rendering the new animated content of the character based on the location within the latent space further comprises:

determining a new intermediate space parameter that corresponds to the new model parameter;

determining a new scaled parameter that corresponds to the new intermediate space parameter;

determining a new rig parameter that corresponds to the new scaled parameter; and rendering a new frame of animation associated with the determined new rig parameter.

25. The non-transitory computer-readable storage medium according to claim 19, wherein the rendered new animated content of the character corresponds to the particle's location within the latent space as the particle is moved within the latent space.

26. The non-transitory computer-readable storage medium according to claim 19, further comprising:

applying a constraint to the particle, wherein the constraint limits the movement of the particle within the latent space.

27. The non-transitory computer-readable storage medium according to claim 26, wherein the constraint constrains the particle to be within a predetermined distance from a path within the latent space.

28. The non-transitory computer-readable storage medium according to claim 19, further comprising:

applying a random force to the particle.

29. The non-transitory computer-readable storage medium according to claim 19, further comprising:

generating a first set of scaled parameters from the first set of rig parameters;

generating a second set of scaled parameters from the second set of rig parameters;

generating a first set of intermediate space parameters from the first set of scaled parameters;

generating a second set of intermediate space parameters from the second set of scaled parameters;

generating the first set of model parameters from the first set of intermediate space parameters; and generating the second set of model parameters from the second set of intermediate space parameters.

30. An apparatus for rendering new animated content according to a character based on existing animated content of the character, the apparatus comprising:

a memory configured to store the existing animated content of the character; and one or more computer processors configured to:

receive a first set of rig parameters corresponding to a first plurality of frames of the existing animated content of the character;

receive a second set of rig parameters corresponding to a second plurality of frames of the existing animated content of the character, the first and second sets of rig parameters having a first dimension;

generate a first set of model parameters based on the first set of rig parameters;

generate a second set of model parameters based on the second set of rig parameters, the first and second sets of model parameters having a second dimension smaller than the first dimension;

generate a latent space that comprises a first semantic model, a second semantic model, and a bridge, wherein:

the latent space has the second dimension, the first semantic model is generated based on the first set of model parameters, the second semantic model is generated based on the second set of model parameters, and the bridge links the first semantic model and the second semantic model;

render the new animated content of the character based on a location within the latent space;

move a particle within the latent space using a particle model;

determine that the particle is not moved for a predetermined amount of time; and in response to determining that the particle is not moved for the predetermined amount of time, move the particle around a hover point within the latent space, wherein the particle does not move beyond a second predetermined distance from the hover point.

* * * * *